March 1, 1960 C. P. HOOVERSON 2,926,950
VEHICLE SEAT
Filed Aug. 11, 1958 3 Sheets-Sheet 3

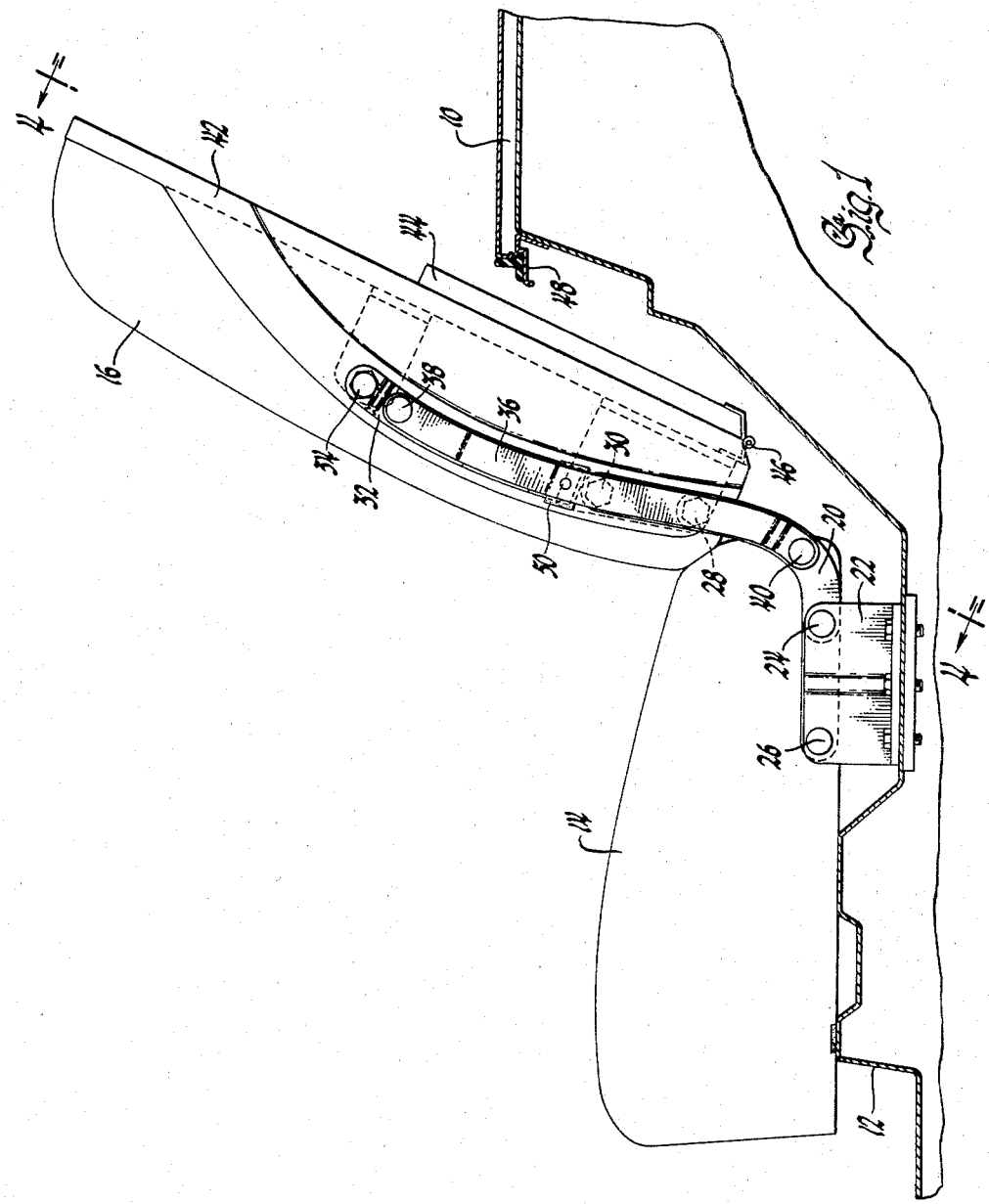

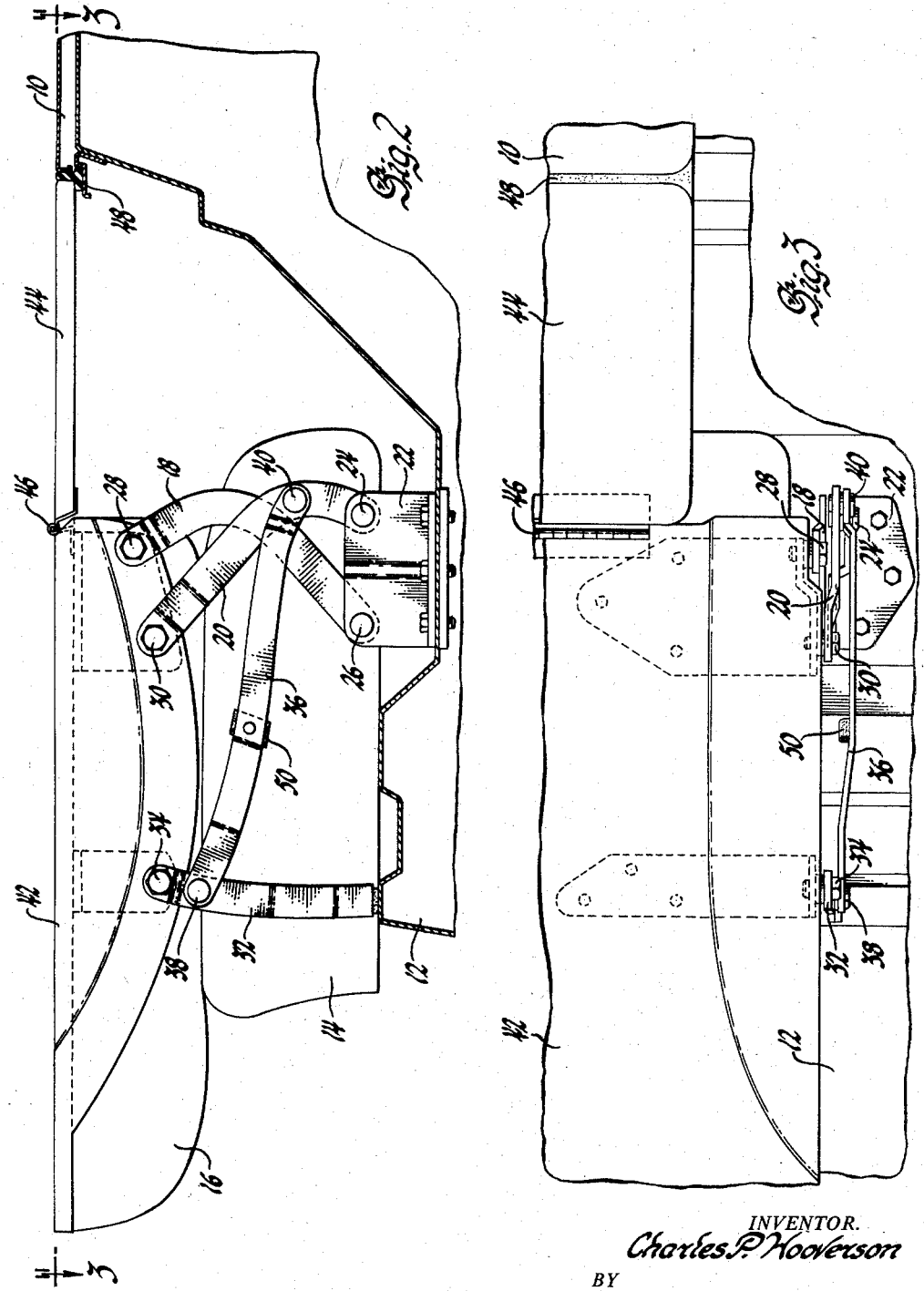

INVENTOR.
Charles P. Hooverson
BY
E. W. Christen
ATTORNEY

United States Patent Office 2,926,950
Patented Mar. 1, 1960

2,926,950

VEHICLE SEAT

Charles P. Hooverson, Orchard Lake, Mich., assignor to General Motors Corporation, Detroit, Mich., a corporation of Delaware Application August 11, 1958, Serial No. 754,390

5 Claims. (Cl. 296—66)

This invention relates to vehicle seats and more particularly to a foldable seat arrangement.

The seating arrangement of the invention is intended for use in muti-purpose vehicles such as station wagons. Station wagons commonly have a second passenger seat disposed rearward of the driver's seat and it is desirable that the second seat be movable from an upright position where a seat is presented to a folded position where a cargo carrying floor is presented above the primary floor. When the second seat is in folded position in accordance with the invention, the seat back is folded over the seat bottom and with the rear side thereof providing a level continuation for the rear or cargo carrying floor which is elevated with respect to the front or primary floor to provide rear axle clearance.

An object of the invention is to provide the seat back with legs that are interconnected with the seat back hinge mechanism to automatically shift the legs from an unobstructing stowage position to a cargo carrying position when the seat back is swung from upright to folded position.

In the drawings:

Figure 1 is a partial sectional view of a station wagon body with the second seat upright for passenger carrying purposes;

Figure 2 is a view similar to Figure 1 with the second seat folded for cargo carrying purposes;

Figure 3 is a partial sectional view taken on the plane indicated by the line 3—3 of Figure 2;

Figures 4, 5:
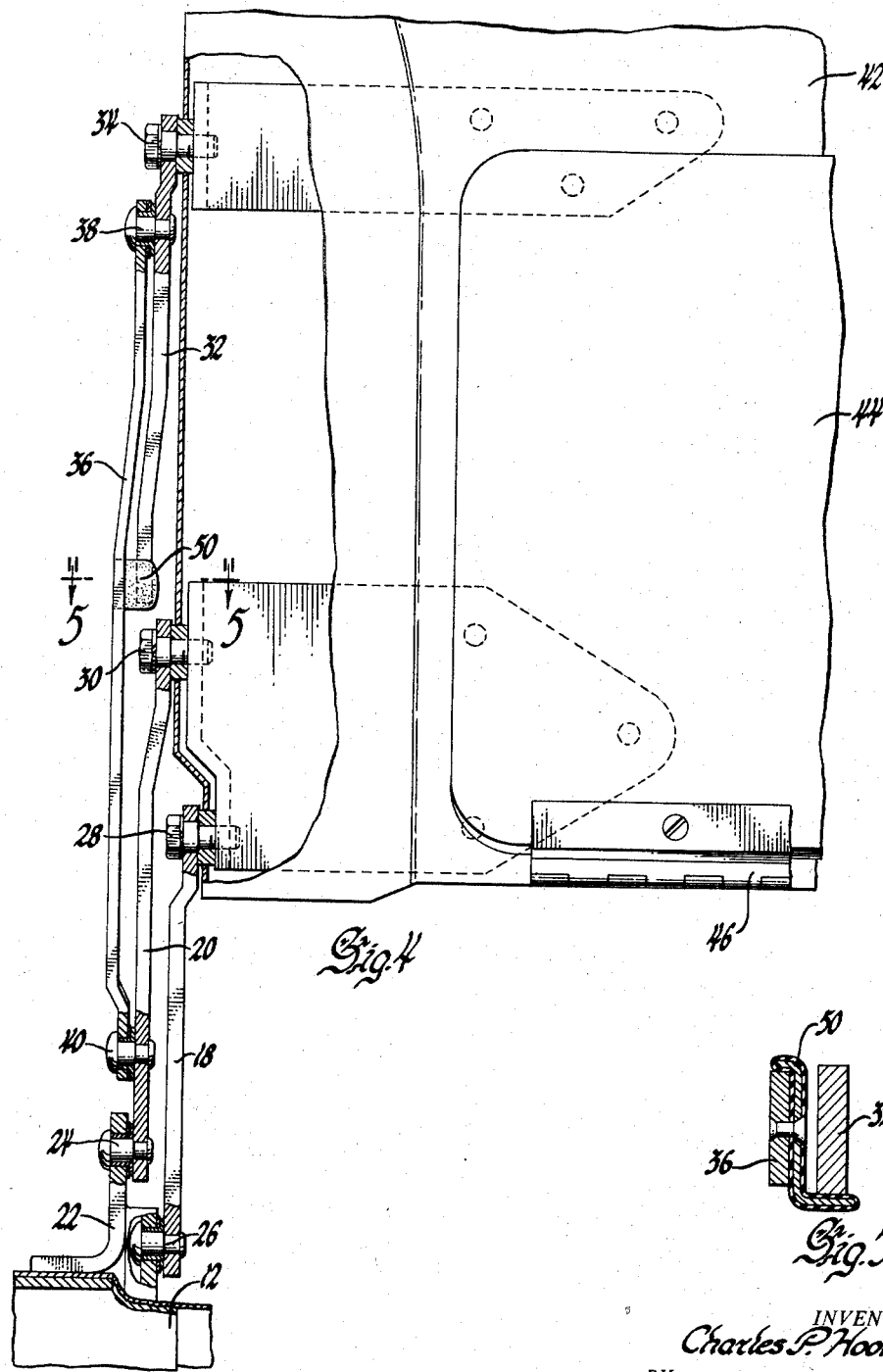
Figure 4 is a partial sectional view, partially broken away, taken on the plane indicated by the line 4—4 of Figure 1.
Figure 5 is a partial sectional view taken on the plane indicated by the line 5—5 of Figure 4.

Referring to the drawings, the station wagon body has a rear cargo carrying floor 10 and a front primary floor 12 that mounts a second seat having a seat bottom 14 and seat back 16. A pair of curved hinge links 18 and 20 have their lower ends pivotally secured to a primary floor bracket 22 by rivets 24 and 26 and their upper ends pivotally secured to the lower portion of the seat back side by bolts 28 and 30. A leg 32 is pivotally secured to the upper portion of the seat back side by a bolt 34 and a lever 36 is pivotally secured to the leg 32 below its seat back pivot connection by a rivet 38 and is pivotally secured to the hinge link 20 above its floor pivot connection by a rivet 40. While the drawings show only the parts on the left side of the seat, it is understood that identical parts are provided on the right side.

To move the seat from the upright position of Figure 1 to the folded position of Figure 2, the seat back 16 is swung manually in a forward direction on the hinge links 18 and 20. This folding movement of the seat back 16 swings the leg 32 from an aligned position with respect to the seat back into a projecting position by means of the lever 36 and hinge link 20 and causes the leg 32 to engage the primary floor 12. The rear face and sides of the seat back 16 have a rigid housing 42 which serves as a cargo carrying forward floor when the seat back is folded and which provides a level continuation of the cargo carrying rear floor 10. The leg 32 and hinge links 18 and 20 provide spaced rigid supports for cargo placed on the seat back housing 42. An auxiliary floor panel 44 is pivotally secured by hinges 46 to the lower edge of the seat back 16 and may be swung downwardly to engage a bracket 48 on the rear floor 10 thus closing the gap between it and the folded seat back. The auxiliary floor panel 44 is releasably secured against the rear face of the seat back 16 in the upright position by a suitable latch, not shown.

The hinge links 18 and 20, the lever 36 and the leg 32 are arranged on top of each other and are aligned with the side of the seat when the seat is in upright position so that they will not obstruct the passengers. The leg 32 engages a cushioned stop 50 on the lever 36 in the upright position to prevent rattle and to secure the seat back 16 against rearward movement about the hinge links 18 and 20.

While the embodiment of the present invention as herein disclosed constitutes the preferred form, it is to be understood that other forms might be adopted.

I claim:

1. A seat back for a vehicle comprising a vehicle floor, means supporting the seat back for movement between an up position where it is generally normal to the floor and a down position where it is generally parallel to the floor, leg means secured to the seat back for movement between an up position where it is generally parallel to the seat back and a down position where it is generally normal to the seat back, and lever means inter-connecting the leg means and seat back supporting means for moving the leg means to the down position to engage the floor when the seat back is moved to the down position and to the up position to eliminate passenger interference when the seat back is moved to the up position, the lever means being aligned with the leg means in superposed relation when the seat back is moved to the up position.

2. A seat back for a vehicle comprising a vehicle floor, hinge linkage means supporting the seat back for movement between an up position where it is generally normal to the floor and a down position where it is generally parallel to the floor, leg means secured to the seat back for movement between an up position where it is generally parallel to the seat back and a down position where it is generally normal to the seat back, and lever means interconnecting the leg means and hinge linkage means for moving the leg means to the down position to engage the floor when the seat back is moved to the down position and to the up position to eliminate passenger interference when the seat back is moved to the up position, the hinge linkage means and lever means being aligned with the leg means in superposed relation when the seat back is moved to the up position.

3. In a vehicle body of the type having a seat bottom and a seat back movable from an upright position where a passenger carrying seat is presented to a folded position over the seat bottom where a cargo carrying floor is presented above the primary floor of the body by the rear face of the seat, the improvement comprising a pair of spaced hinge links each pivotally connected to the body and to the lower portion of the seat back side, a leg pivotally connected to the upper portion of the seat back side, and a lever pivotally connected to the leg below its seat back pivot and to one of the hinge links between its body and seat back pivots whereby movement of the seat back on the hinge links from upright to folded position moves the lever to move the leg to a cargo carrying position in engagement with the primary floor, the hinge links and lever and leg being in superposed alignment with the seat back side when the seat back is in upright position to eliminate interference to passengers.

4. In a vehicle body of the type having a seat bottom and a seat back movable from an upright position where a passenger carrying seat is presented to a folded position over the seat bottom where a cargo carrying floor is presented above the primary floor of the body by the rear face of the seat, the improvement comprising hinge means connected to the body and to the lower portion of the seat back side, a leg pivotally connected to the upper portion of the seat back side, and a lever pivotally connected to the leg below its seat back pivot and to the hinge means whereby movement of the seat back on the hinge means from upright to folded position moves the lever to move the leg to a cargo carrying position in engagement with the primary floor, the lever and leg being in superposed alignment with the seat back side when the seat back is in upright position to eliminate interference to passengers.

5. In a vehicle body of the type having a seat bottom and a seat back movable from an upright position where a passenger carrying seat is presented to a folded position over the seat bottom where a cargo carrying floor is presented above the primary floor of the body by the rear face of the seat, the improvement comprising hinge linkage pivotally connected to the body and to the lower portion of the seat back side, a leg pivotally connected to the upper portion of the seat back side, and a lever pivotally connected to the leg below its seat back pivot and the hinge linkage between its body and seat back pivots whereby movement of the seat back on the hinge linkage from upright to folded position moves the lever to move the leg to a cargo carrying position in engagement with the primary floor, the hinge linkage and lever and leg being in superposed alignment with the seat back side when the seat back is in upright position to eliminate interference to passengers and the leg being engaged with the lever to secure the seat pack in upright position.

References Cited in the file of this patent

UNITED STATES PATENTS 1,592,593    Anderson _____ July 13, 1926

FOREIGN PATENTS 928,506    Germany _____ June 2, 1955